July 25, 1967    O. BUCHHEIT    3,332,539
OSCILLATING RAKE TYPE COOLING BED FOR ROLLED METAL
Filed Oct. 23, 1965
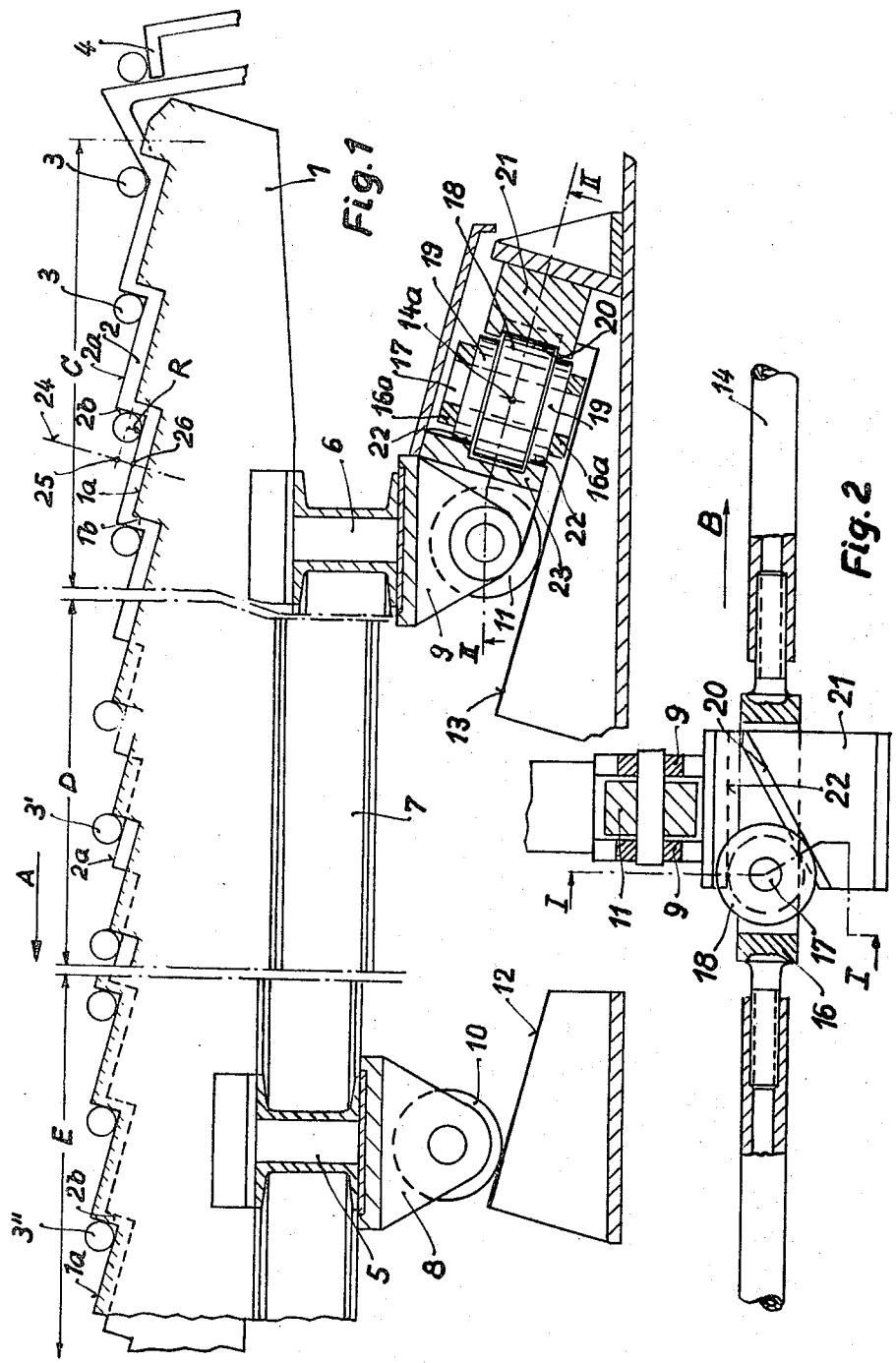

3,332,539
OSCILLATING RAKE TYPE COOLING BED FOR ROLLED METAL
Otto Buchheit, St. Ingbert, Saar, Germany, assignor to Verwaltungsgesellschaft Moeller & Neuman, St. Ingbert, Saar, Germany
Filed Oct. 23, 1965, Ser. No. 503,539
Claims priority, application Germany, Apr. 12, 1965, V 28,262
4 Claims. (Cl. 198—219)

ABSTRACT OF THE DISCLOSURE

The movable and tooth-shaped rake bars 1 of a rake type cooling bed for rolled material are supported over rollers 10, 11 on ramp surfaces 12, 13 ascending in the feeding direction of the cooling bed and are driven in an oscillating manner. The ramp surfaces 12, 13 extend parallel to the ascending surfaces 1a and 2a of the rakes of the cooling bed so that with a correspondingly staggered arrangement of the otherwise identical teeth of the movable rakes 1 and of the stationary rakes 2 the metal rods are transported in a stepwise manner exclusively by a forward pushing action and without requiring a lifting action.

---

The invention relates to an oscillating rake type cooling bed for rolled metal rods the rakes having tooth-like rake bars which are fixed and similar rake bars which are movable in the conveyor direction, the movable rake bars being located in the starting position with their teeth under those of the fixed bars.

It is customary that the movable rake bars, as a unit called an oscillating grate, carry out circular or elliptical oscillating movements in order to lift the rolled rods from the fixed notches and deposit them in the next notch of the fixed or stationary grate. The driving means for producing these circular swinging movements consisting of excenters, guide levers, long drive shafts, bearings, drives and motors, constitute by far the largest part of the installation costs for this type of cooling beds.

The so-called Edwards cooling beds have actually a simpler driving unit but the desirable straightening effect is smaller in that unit because the rods only slide or roll while in the oscillating rake cooling bed they are abruptly decelerated from a fast, freely rotating movement during redeposition. The invention shows a way of retaining this straightening effect of a swinging rake cooling bed while providing savings in the driving unit which become even larger the less sensitive the material to be cooled is to the sliding movements which must be taken into consideration in the construction of an oscillating rake cooling bed according to this invention the same as in the Edwards cooling beds.

Starting from an oscillating rake cooling bed of the above defined type the invention consists of a cooling bed in which the rolled rods are pushed ahead during a conveyor stroke of the movable rake bars by their steeper side surfaces over the ascending side surfaces of the fixed rake bars until, due to the only partial covering of the steep side surfaces of the fixed and movable rake bars which descend in the conveyor direction, they drop down first partway to the ascending side surfaces of the movable rake bars and after their return stroke a further distance to the ascending side surfaces of the fixed rake bars. During one conveyor stroke the effective straightening action thus occurs twice.

It is a primary object of the invention that the inclined straight-line movement of the oscillating grate allows the simple push rod drive which is also possible in the Edwards cooling beds. The movable rake bars may be regulated according to the invention by a wedge drive to be described more fully hereafter. By means of a drive incorporating a movement of this type the weight of an oscillating rake cooling bed is reduced with respect to the conventional structure with a circular movement of the grate by about 75%. If one takes further into consideration that the omitted driving means, especially the drives, the excenters and shafts, are expensive in the kilogram weight, an even greater cost saving is obtained.

The invention will be described in greater detail hereafter with reference to the accompanying drawings illustrating an embodiment of the invention given by way of an example only and in which:

FIGURE 1 shows a cross-section parallel to the rake rods, and

FIGURE 2 shows a wedge drive in cross-section along line II—II of FIGURE 1.

The cross-section according to FIGURE 1 is so carried out that a movable rake bar 1 is completely visible and covers the subsequent fixed rake bar 2 in the area C up to the higher contours of its tooth formation. The total of the rakes 1 forms the so called movable grate 1 and similarly the fixed rakes 2 constitute the fixed grate 2. The tooth formation of the rake bars are similar in the embodiment illustrated and the side surfaces ascending in the conveyor direction A are designated by 1a and 2a, the steeper descending side surfaces are designated by 1b and 2b. In the starting position illustrated in the range C the movable rake bars 1 are located below the tooth formation of the fixed rake bars 2, in whose tooth gaps round rods 3 are located. These rods are lifted from the not specifically illustrated feeding roller track by means of the movable base plates 4 and transferred to the first notch of the fixed grate 2.

The movable rake bars 1 are carried by cross beams 5, 6 which are united by longitudinal beam 7 into one or more rigid frames. In the range of the cross beams 5, 6 bearings stands 8, 9 are mounted in larger intervals and support rollers 10, 11 are mounted in them. Over these support rollers the oscillating frame with the movable rake bars rests on inclined ascending planes 12, 13 which ascend in the conveyor direction parallel to the side 1a and 2a and can be regulated back and forth by means of a subsequent described wedge drive over a greater effective conveyor stroke than the length of the sides 2a.

The drive for the oscillating grate movements consists of a rod train 14 (FIGURE 2) and the rod center 14a (FIGURE 1) which extends transversely of the rake bars in the range of the inclined ramp-type plane 13. The rod train 14 may be axially displaced by a not illustrated drive means for providing a back and forth movement, appropriately by an hydraulic motor. Support members 16 are intermediately connected in the manner of a tensioning nut into the rod train 14 in the range of the individual inclined ramp surfaces 13, and in their side walls 16a a shaft 17 is mounted. This shaft carries three rollers which are rotatable independently of each other, of which the larger center roller 18 bears on an inclined wedge surface 20 of a stationary wedge 21 which ascends in the pulling direction B (FIGURE 2) and the two adjacent rollers 19 of smaller diameter lie against back up surfaces 22 of a plate 23 arranged at the movable rake bars 1 or their oscillating frames 5 to 7, the plate 23 being fixed to the bearing stands 9 for the support rollers 11. In place of the rollers 18, 19 one may obviously also employ sliding elements which, generally speaking, are guided between stationary support surfaces which are arranged at the movable rake bars 1 which approach each other in the pulling direction of the rod train 14.

All the wedge surfaces 20 and back up surfaces 22 extend vertically to the inclined ramp planes 12, 13 so that the support bodies 16 and their roller shafts 17 are guided in the inclined position illustrated in FIGURE 1. With a setting movement of the rod train 14 in the pulling direction B the larger rollers 18 travel up on the wedge surfaces 20 wherein the rod train 14 is moved parallel to itself and the rollers 19 which press against the back-up surfaces 22, force the conveyor stroke of the movable rake bars 1 or of the oscillating grate in the direction of the inclined ramp surfaces 12, 13. In order to permit this parallel movement the setting motor is arranged in an oscillating manner. As the rake bars 1 tend to return automatically due to their rolling support on the ramp surfaces 12, 13 and due to their proper weight, the weight of the oscillating grate is effective during a reversing of the setting motor upon pushing of the rod train 14 over the wedge transmissions in a pulling manner on the rod train. Since due to the unavoidable heat expansions the oscillating grate 1 with its support rollers 10, 11, cannot be guided so as to stay in one line or track it must be guided at one end in a plane extending parallel to the conveyor direction.

To explain the effect of the oscillating rake cooling bed according to the invention the movable rake bar 1 as shown in FIGURE 1 is illustrated in three different positions, namely in range C in the starting position, in range D in the advancing position and in range E at the end of the advancing movement or at the beginning of the return stroke.

In the range E the side surfaces 1b of the movable rake bars 1 push the rolled rods 3 in front of them wherein they roll or slide on the side surfaces 2a of the fixed rake bars 2. As the effective conveyor stroke of the movable rake bars 1 is larger than the length of the supporting side surfaces 2a of the fixed rake bars, the rods 3' lose during the last part of the conveyor stroke, until the position after range E, their support and drop on the side surfaces 1a of the movable rake bars 1 in the position 3''. During the return stroke the steep surfaces 2b of the fixed rake bars 2 start to be operative in that they retain the rods 3'' wherein the latter now roll or slide on the returning surfaces 1a. As soon as steep side surfaces 1b of the movable rake bars recede shortly before their starting position after range C behind the steep side surfaces 2b of the stationary rake bars 2, the rods 3'' drop into the adjacent notch of the fixed rake bars 2. In this manner the second straightening effect during one conveyor stroke takes place by a free fall of the rolled rods.

It is a characteristic feature of the invention that the side surfaces 1b and 2b for the teeth of the rake bars which descend in the conveyor direction B cover each other partly in their projection on a plane 24 imagined to extend normal to the incluined ramp planes 12, 13 and more specifically approximately over the radius R of the thickest round rod to be handled. The covering length lies in the imagined plane 24 between the points 25 and 26. If this length were substantially shorter than the radius R, the thickest round rods would be struck below their gravity line by the side surfaces 1b and could travel back over the tooth points so that they would not be conveyed farther. If the covering length 25, 26 were substantially larger than the maximum existing radius R or half the height of the rolled material, the flanks 2b of the stationary rake bars 2 which retain the rolled material during the return stroke of the movable rake bars 1, would grasp the rolled material below its gravity line whereby it could also unintentionally travel back over a tooth point.

As mentioned initially, the quality and sensitivity of the rolled rods to be cooled is essential in determining if one is in a position to use, due to the unavoidable sliding movement, the extremely cost saving cooling bed of the invention. In the way of a compromise one can sacrifice a part of the cost savings in that the stationary grate 2 which conventionally consists in the first channels of straightening plates which prevent a bending of the rods which have been only slightly rolled, by providing it over at least half its width with such plates. These additional straightening plates, which may be extended over the entire width of the cooling bed, represent a considerable weight but they involve small manufacturing costs. Due to the increased range of straightening plates the specific bearing pressure of the rods is reduced, at least during the conveyor stroke of the oscillating grate, to the extent that the surface of the rolled material cannot be damaged. In order to avoid damage during the return stroke during which the rods slide on the narrow movable rake bars 1 or on the steep side surfaces 2b of the stationary rake bars 2, at least these side surfaces could be covered with soft, heat resistant strips, for example of synthetic material containing indicated coal or silicon.

What is claimed is:

1. Oscillating rake cooling bed for rolled metal rods having stationary rakes and rakes movable in a reciprocating manner in the feeding direction of the rods, the teeth of said movable rakes being disposed in the starting position of the rakes below the teeth of said stationary rakes, said teeth of said stationary rakes and of said movable rakes being shaped identically and having first surfaces ascending in the feeding direction of the cooling bed and second surfaces descending in the feeding direction of the cooling bed, said movable rakes being each guided at two support points on two inclined, straight, ramp-like surfaces extending approximately parallel to said first surfaces and normal to said second surfaces of said teeth, said second surfaces of said teeth of said movable rakes and of said stationary rakes overlapping at each relative position in their projection on a plane extending normal to said straight ramp-like surfaces by about half the height or radius of the thickest rods, and drive means for producing a reciprocating movement of each support point of said movable rakes in a straight inclined line in accordance with the inclination of said two supporting ramp-like surfaces, the effective feeding stroke of the movable rakes being longer than the length of said first surfaces of said stationary rakes.

2. A rake cooling bed according to claim 1 wherein the movable rakes are driven by a wedge drive over a push rod linkage extending transversely of the rakes and reciprocable lengthwise thereof and including rolling or sliding elements guided between stationary support surfaces fixed to said movable rakes, said support surfaces approaching each other in the pulling direction of said push rod linkage, said movable rakes being supported on the ramp-like surfaces so as to roll or slide automatically under their own weight back into said starting position.

3. A rake cooling bed according to claim 2 wherein a rolling element of the push rod linkage consists of three rollers mounted independently of each other on a shaft, the central roller having a large diameter and bearing on the stationary wedge surface ascending in the pulling direction of said push rod linkage, the two other rollers on each side of said central roller having a smaller diameter and bearing on opposite surfaces mounted on said movable rakes, all the wedge surfaces and bearing surfaces extending vertically to said ramp-like surfaces and said push rod linkage being coupled to its setting drive so as to carry out parallel movements.

4. A rake cooling bed according to claim 3 including a stationary grate having a plurality of straightening plates at the initial rake channels said straightening plates covering at least half the width of the stationary grate.

References Cited

UNITED STATES PATENTS 3,265,187 8/1966 Hein et al. _____ 198—219 X

FOREIGN PATENTS 1,026,686 3/1958 Germany.

EVON C. BLUNK, *Primary Examiner.*

A. C. HODGSON, *Assistant Examiner.*